United States Patent [19]

Matsuura

[11] Patent Number: 4,494,289

[45] Date of Patent: Jan. 22, 1985

[54] COIL SPRING COMPRESSOR FOR ASSEMBLING AUTOMOTIVE SUSPENSION

[75] Inventor: Tsuyoshi Matsuura, Toyota, Japan

[73] Assignee: Toyota Jidosha Kabushiki Kaisha, Toyota, Japan

[21] Appl. No.: 468,873

[22] Filed: Feb. 23, 1983

[30] Foreign Application Priority Data

Mar. 17, 1982 [JP] Japan .............................. 57-38439[U]

[51] Int. Cl.³ .............................................. B23P 19/04
[52] U.S. Cl. ...................................... 29/227; 254/10.5
[58] Field of Search .................. 29/227, 225, 215, 216, 29/217, 218; 254/10.5

[56] References Cited

U.S. PATENT DOCUMENTS

| | | | |
|---|---|---|---|
| 4,009,867 | 3/1977 | Diffenderfer | 254/10.5 |
| 4,105,188 | 8/1978 | Mendoza et al. | 254/10.5 |
| 4,295,634 | 10/1981 | Spainhour et al. | 29/227 |
| 4,395,020 | 7/1983 | Spainhour | 29/227 |

FOREIGN PATENT DOCUMENTS

| | | | |
|---|---|---|---|
| 3021084 | 12/1981 | Fed. Rep. of Germany | 254/10.5 |
| 56-109826 | 12/1981 | Japan . | |
| 57-1630 | 1/1982 | Japan . | |

*Primary Examiner*—James L. Jones, Jr.
*Attorney, Agent, or Firm*—Finnegan, Henderson, Farabow, Garrett & Dunner

[57] ABSTRACT

A coil spring compressor for compressing a coil spring during the assembly of subassemblies of automotive suspension systems, having a head plate positioned above a base and movable with respect to the base. The coil spring compressor is provided with a pair of guide bars suspended from the head plate and on which a slidable carriage is mounted. The carriage carries a pair of compressing assemblies facing each other and positioned at both sides of the coil spring. Each assembly comprises a pair of compressor arms interconnected with each other. Each compressor arm is provided with a finger mount to which a compressing finger is adjustably attached. The fingers are introduced between two successive turns of the coil spring by operating handles provided on the compressor arms.

5 Claims, 11 Drawing Figures

COIL SPRING COMPRESSOR FOR ASSEMBLING AUTOMOTIVE SUSPENSION

BACKGROUND OF THE INVENTION

1. Field of the Invention

The present invention relates to a coil spring compressor which is used in the assembly of subassemblies of automotive front or rear suspension systems, in particular, MacPherson type suspension systems.

2. Description of the Prior Art

Certain types of automotive suspension system such as of the MacPherson type comprise a suspension subassembly. The subassembly includes a strut formed by a lower tube. The strut includes a built-in shock absorber. A part of a piston of the shock absorber projects upward from the strut in a telescoping fashion. A coil spring is mounted in a compressed state around the strut between a lower spring seat integral with the strut and an upper spring seat fastened to the upper end of the piston of the shock absorber. Such a suspension subassembly is assembled separately and then mounted as a unit in a vehicle body.

During the assembly of a MacPherson type suspension subassembly, the coil spring is passed from above around the stanchion with its lower end abutting against the lower spring seat. The coil spring is then compressed by a suitable power tool to bring the upper end of the coil spring below the upper end of the piston of the shock absorber, so that the piston upper end protrudes beyond the coil spring upper end. The upper spring seat is then fastened to a threaded part of the upper end of the shock absorber piston by a nut through an upper support. As a result, the coil spring is retained between the upper and lower spring seats in a compressed state.

Japanese Unexamined Utility Model Publication (Kokai) No. 56-109826 and Japanese Unexamined patent publication (Kokai) No. 57-1630 disclose a type of device for compressing the coil spring for the above-mentioned purposes. Such a coil spring compressor comprises a movable head plate positioned above a base. The head plate is mounted on the top of a vertically slidable drive shaft which is driven upward and downward by a rotary drive mounted on the base and driven by a motor through a clutch. The vertical movement of the head plate is guided by a pair of slide bars connected thereto and slidingly received within a pair of guide blocks secured to the base. The head plate is provided with a spring compressing mechanism having a plurality of push-down fingers (or hooks) which are adapted to push the coil spring down thereby to compress the coil spring and which are designed to protract toward and retract from the coil spring mounted on the MacPherson strut. When the head plate is moved downward for a predetermined distance with the push-down fingers engaging the coil spring, the coil spring is compressed to a desired degree allowing the operator to fasten a nut to retain the upper spring seat. Normally, the push-down fingers, which will be referred to merely as fingers hereinafter, should be so positioned that they engage between the first and second turns of the coil spring to permit the upper spring seat to be placed on the upper free end of the spring. The length and pitch of a coil spring in its free relaxed position vary according to the particular suspension system to be assembled. Thus, the vertical positions of the fingers must be adjusted depending on the particular coil spring used. Failure to adjust the position would cause the upper end of the coil spring to be eccentric or inclined with respect to the longitudinal axis of the shock absorber, resulting in a relative positional deflection between the coil spring and the upper spring seat.

Japanese Unexamined patent publication No. 57-1630 discloses a position adjusting means comprising a plurality of limit switches. Japanese Unexamined Utility Model Publication No. 56-109826 discloses an adjusting mechanism employing cam mechanisms. The limit-switch adjusting mechanism is disadvantageous in that it entails a large number of limit switch positions in order accommodate coil springs of various sizes and that the positions of the limit switches must be altered each time the size of the coil spring is changed. Moreover, the electric circuit connecting the limit switches is complicated, making the maintenance thereof troublesome. The cam-mechanism adjusting mechanism suffers from similar disadvantages and, in some cases, requires alteration of the cam profile.

In the copending patent application Ser. No. 453,839 filed Dec. 28, 1982, and assigned to the assignee of the present invention, there is disclosed a coil spring compressor suitably used for compressing a coil spring during the assembly of MacPherson type suspension subassemblies. This coil spring compressor comprises a base, a movable head plate positioned above the base for translational movement thereto, and means for driving the head plate toward and away from the base. The head plate is provided with a pair of spaced guide bars connected thereto and suspended therefrom. A carriage is mounted on the guide bars for vertical sliding movement through a predetermined distance. The carriage is provided with a frontal opening having a sufficient size to receive therethrough without interference a coil spring to be compressed. The carriage is provided with four compressor arms, each of which is pivoted at an end to the carriage and is provided at the other end with a push-down finger (or hook) projecting toward and engageable with any selected turn of the coil spring. The four compressor arms are grouped into two pairs, one of which is arranged along one side of the frontal opening of the carriage and the other along the opposite side. The front and rear compressor arms in each pair are interlocked with each other so that when the front arm in each pair is rotated toward and away from the coil spring, the rear arm swings conjointly with the front arm toward and away from the coil spring. The front arm in each pair is provided with an operating handle. In use, the operator first slides the carriage upward and downward along the guide bars and adjusts the vertical position of the carriage so that the fingers or hooks are leveled between the desired successive turns of the coil spring, normally between the first and second turns. Then, the operator closes the handle together to insert the hooks between the selected turns of the coil spring and turns on the drive means to lower the head plate. As the head plate travels downward, the hooks are urged against the second turn of the spring and compress the same to the desired degree.

In the coil spring compressor of the type described, however, the vertical positions of the push-down fingers or hooks cannot be independently adjusted. In other words, the fingers are immovably secured to the corresponding compressor arms and, accordingly, it is impossible to independently adjust the vertical positions of the fingers in each pair. Therefore, even if one of the fingers does not come into contact with the coil spring when the fingers are brought into engagement with the coil spring to compress the latter, no adjustment of the vertical position of the finger in question can be effected. This will result in the coil spring being off center with respect to the strut.

SUMMARY OF THE INVENTION

The object of the present invention is to provide a coil spring compressor in which the vertical positions of the push-down fingers may be independently and readily adjusted relative to the coil spring to be assembled.

According to the present invention, there is provided a coil spring compressor of the kind described in the copending application mentioned above wherein the push-down fingers are adjustably connected to the corresponding compressor arms so as to allow independent adjustment of the relative positions of the push-down fingers to the corresponding compressor arms and thereby to allow all of the fingers to come into engagement with the associated portions of the coil spring.

With this arrangement, if any one (or two) of the fingers does not come into engagement with the coil spring despite that the remaining fingers being in engagement, it is possible to adjust the finger or fingers in question to enable all the fingers to come into contact with the coil spring.

Further properties of the invention will become apparent from the detailed description given below.

BRIEF DESCRIPTION OF THE DRAWINGS

A preferred embodiment of the invention is illustrated in the accompanying drawings, which are given by way of non-limitative example, wherein.

DESCRIPTION OF THE PREFERRED EMBODIMENT

Figure 1:
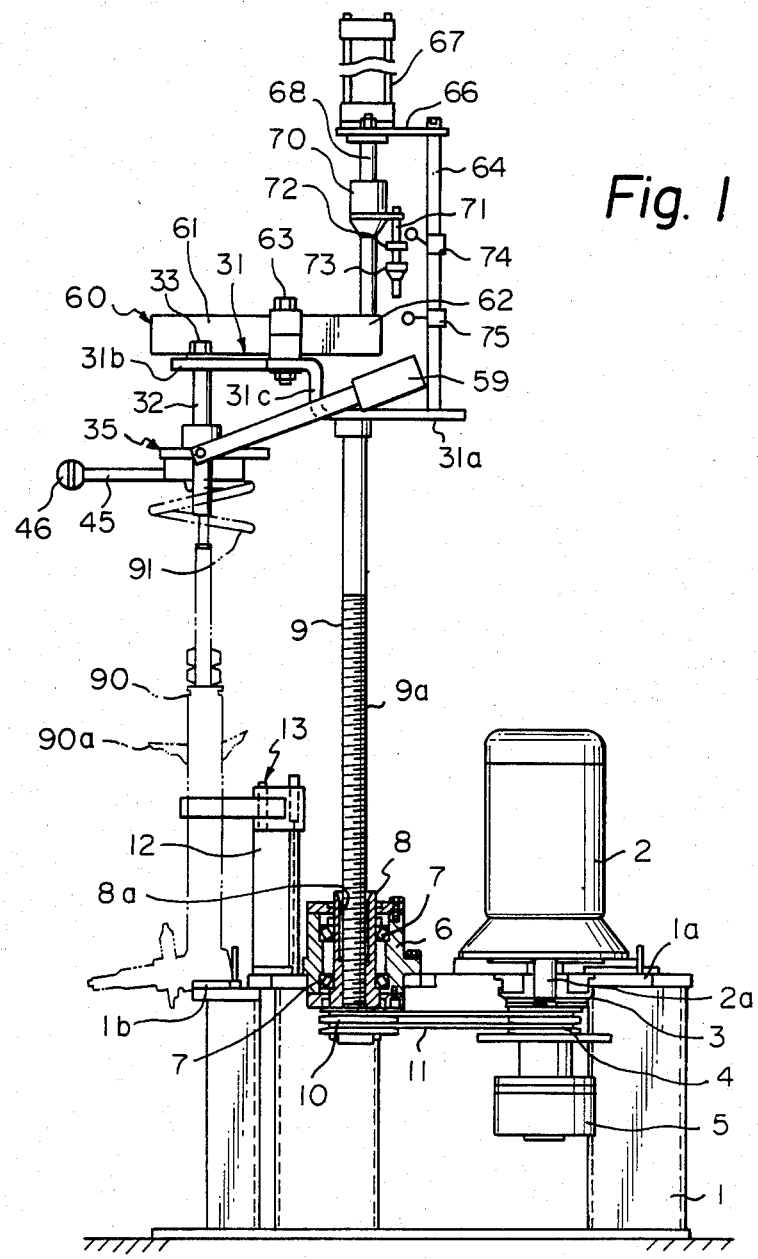
FIG. 1 is a left-hand side elevational view of an embodiment of the coil spring compressor according to the invention.
Figure 2:
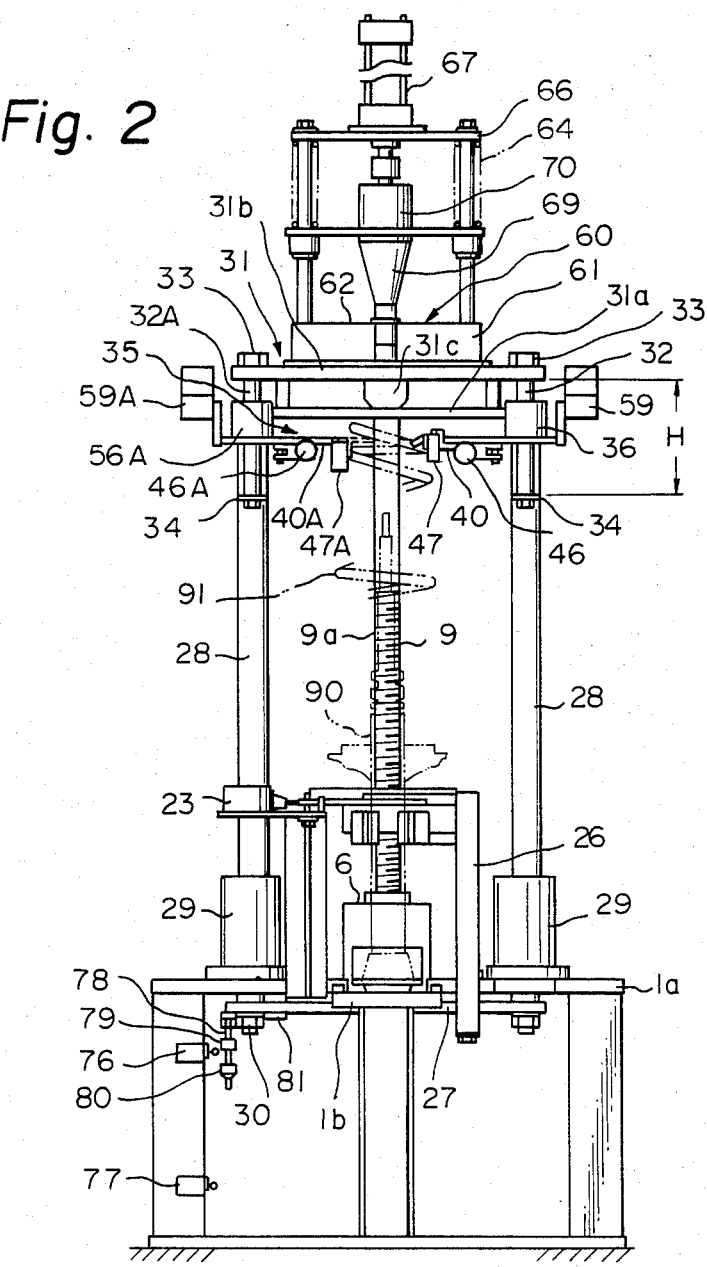
FIG. 2 is a front elevational view of FIG. 1.

Referring now to the drawings, FIGS. 1 and 2 illustrate an embodiment of the coil spring compressor according to the invention. In FIG. 1, the coil spring compressor includes a base 1 having a top plate 1a positioned at a predetermined level. An electric motor 2 is mounted on the top plate 1a with its shaft 2a projecting downward therefrom. The motor 2 is of the reversible type and its shaft 2a is connected to a driving pulley 4 through an electromagnetic clutch 3. The pulley 4 is mounted rotatably above a brake 5 which cooperates with the clutch 3 to brake the pulley when the latter is disconnected from the motor shaft 2a. In front of the motor 2, the top plate 1a is provided with a tubular housing 6 in which a drive sleeve 8 is mounted for rotation by means of a pair of axial thrust bearings 7. The drive sleeve 8 has an inner peripheral threaded portion 8a which is in meshing engagement with the externally threaded portions 9a of a vertically movable drive shaft 9 extending through the drive sleeve 8. The lower end of the sleeve 8 projects downward beyond the top plate 1a and a driven pulley 10 is connected thereto for rotation therewith. Endless belts 11 are entrained over the pulleys 4 and 10, so that when the driving pulley 4 turns in one direction, the driven pulley 10 is rotated together with the drive sleeve 8 causing the drive shaft 9 to move upward, and vice versa.

In front of the sleeve housing 6, a support 12 is rigidly fixed on the top plate 1a. This support 12 supports at its top a clamping mechanism 13 for clamping a strut 90 forming part of the MacPherson type automotive suspension system.

A bed plate 1b is mounted on the forward end of the top plate 1a underneath the clamping mechanism 13 for placing the strut 90 thereon.

Figure 3:
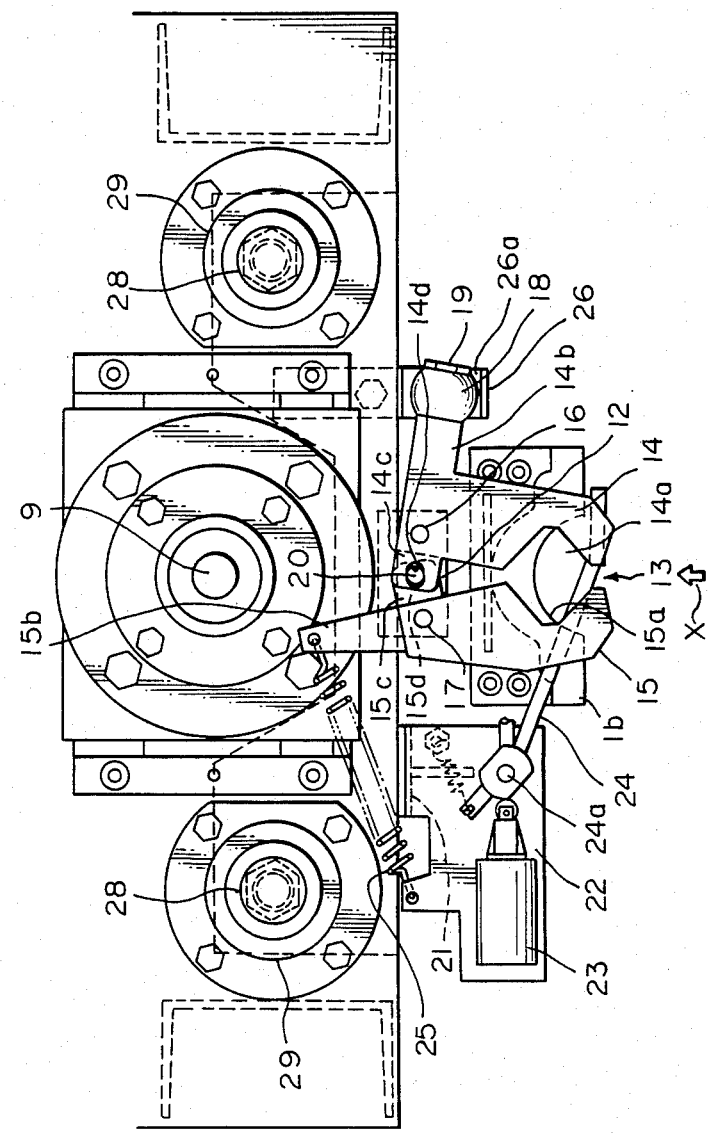
FIG. 3 is an enlarged top plan view of a strut clamping mechanism.

As shown in FIG. 3, the clamping mechanism 13 includes a pair of swingable clamping arms 14 and 15 pivoted to the support 12 by means of pins 16 and 17, respectively. The arms 14 and 15 are provided, near the forward ends thereof, with opposing triangular recesses 14a and 15a defining clamping jaws. The rear end of the left-hand arm 14 (when viewed toward the front from behind) extends at a substantially right angle to the remaining part of the arm to form a lever 14b, at the end of which a roller 18 is mounted rotatably by way of a pin 19. The rear end of the arm 14 opposite the lever portion 14b is formed into a coupling portion 14c having an elongated slot 14d. The right-hand arm 15 is provided with a lever portion 15b and is also provided with a coupling portion 15c projecting toward the associated coupling portion 14c of the left-hand arm 14 and having an elongated slot 15d. A coupling pin 20 is engaged within the slots 14d and 15d to movably couple the arms 14 and 15 together.

Figure 4:
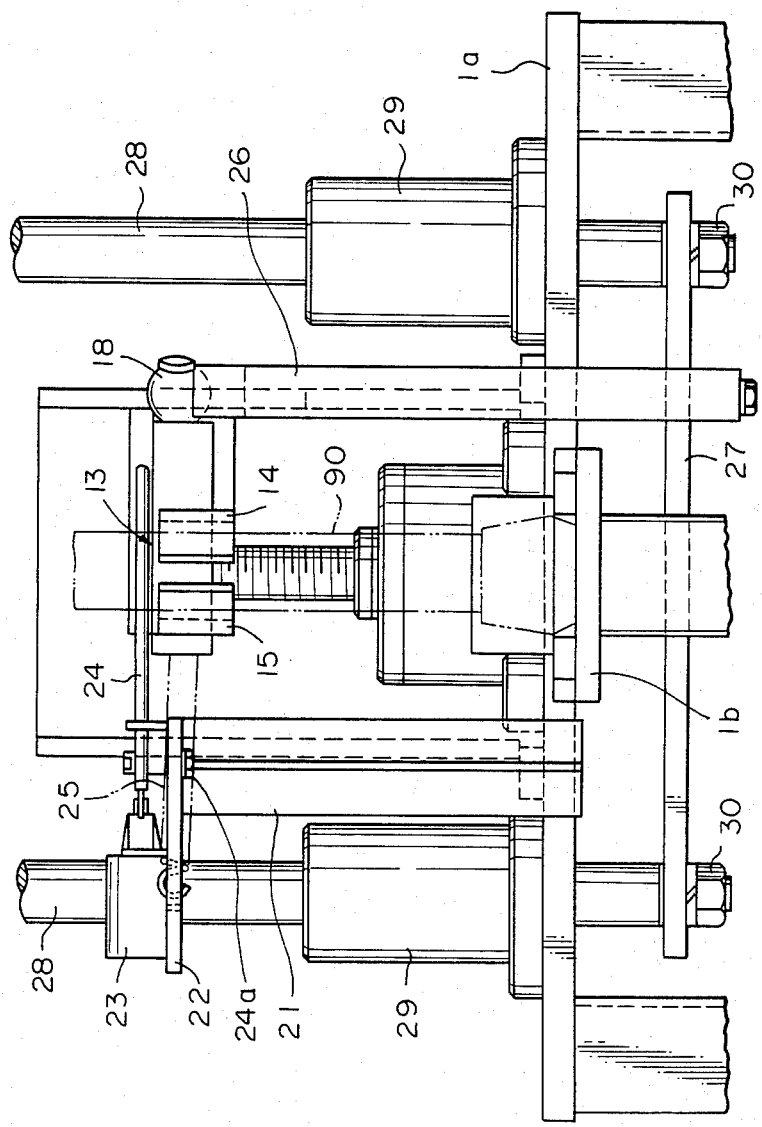
FIG. 4 is an enlarged front elevational view of the strut clamping mechanism of FIG. 3.

As shown in FIG. 4, a switching mechanism for the clamping arms 14 and 15 includes a T-shaped support 21 (FIG. 3) which is mounted to the top plate 1a and carries at its top a switch mounting plate 22. A sensing lever 24 is pivoted to the switch mounting plate 22 by a bolt 24a and is adapted to engage with a limit switch 23 which is electrically connected to the motor 2 (see also FIG. 3).

Referring to both FIGS. 3 and 4, a compression coil spring 25 is tensed between the switch mounting plate 22 and a lever portion 15b of the clamping arm 15 so as to continuously bias to rotate the arm 15 about its pivot 17 in the counterclockwise direction as viewed in FIG. 3.

The closing and opening movement of the clamping arms 14 and 15 of the clamping mechanism 13 is controlled by a cam bar 26 connected to a cross member 27 which moves upward and downward together with the drive shaft 9. The cam bar 26 is provided with a cam surface 26a in the form of an inclined surface against which the roller 18 bears and rolles. The cam surface 26a is so arranged that when the cam bar 26 rises, it urges the roller 18 causing the arm 14 to swing about the pin 16 in the counterclockwise direction as viewed in FIG. 3, the movement of the arm 14 being transmitted through the coupling pin 20 to the other arm 15 causing it to swing in the clockwise direction about its pivot 17 against the action of the return spring 25 so that the arms 14 and 15 move away from each other to open the clamping mechanism 13. To the contrary, when the cam bar 26 lowers, the cam surface 26a releases the roller 18 allowing the arm 15 to return counterclockwise under the sprrng action so that the arm 14 rotates in the clockwise direction to close the clamping mechanism 13.

The sensing lever 24 is pushed backward by the strut 90 when the strut 90 is loaded on the bed plate 16 from the front. That is, the sensing lever 24 is rotated around the bolt 24a in the counterclockwise direction by the strut 90 when the strut 90 is loaded on the bed plate 16 from a direction designated by an arrow X in FIG. 3, so that the limit switch 23 becomes ON, thereby to make the motor 2 ON.

As shown in FIG. 2, a head plate 31 is rigidly connected to the top of the movable shaft 9 for upward and downward movement together with the shaft 9. A pair of vertical slide bars 28, 28 are connected at their upper ends to the head plate 31 by means of bolts (not shown) and extend therefrom vertically downward through the top plate 1a. The lower parts of the slide bars 28, 28 are received for sliding movement within a pair of guide blocks 29, 29 mounted on the top plate 1a. The lower ends of the slide bars 28, 28 projecting below the top plate 1a are connected together by means of the cross member 27 firmly fastened thereto by nuts 30, 30 (FIG. 4). Thus, the drive shaft 9, head plate 31, slide bars 28, 28, and cross member 27 form together a vertically movable frame unit which moves upward and downward and which is guided by the guide blocks 29, 29 as the drive shaft 9 moves up and down.

Referring to FIGS. 1 and 2, head plate 31 comprises a lower rear part 31a connected to the drive shaft 9 and slide bars 28, 28, an upper part 31b extending at a higher level, and an intermediate part 31c connecting the two parts 31a and 31b. Thus, the head plate 31 has a substantially Z-shaped cross-section leaving a relatively free frontal space thereunder.

A pair of guide bars 32 and 32A are suspended from the upper frontal part 31b of the head plate 31 and are rigidly connected thereto at their upper ends by means of nuts 33, 33. A carriage 35 for the spring compressing mechanism is slidably mounted on the guide bars 32 and 32A by means of bosses 36 and 36A forming part of the slidable carriage 35 and having cylindrical apertures in which the guide bars 32 and 32A are passed. A pair of stops 34, 34 are provided at the lower ends of the guide bars 32 and 32A to prevent the carriage 35 from being slipped down out of the bars 32 and 32A. The guide bars 32 and 32A have a predetermined length so that the carriage 35 can move along the guide bars through a height H (FIG. 2).

Figure 5:
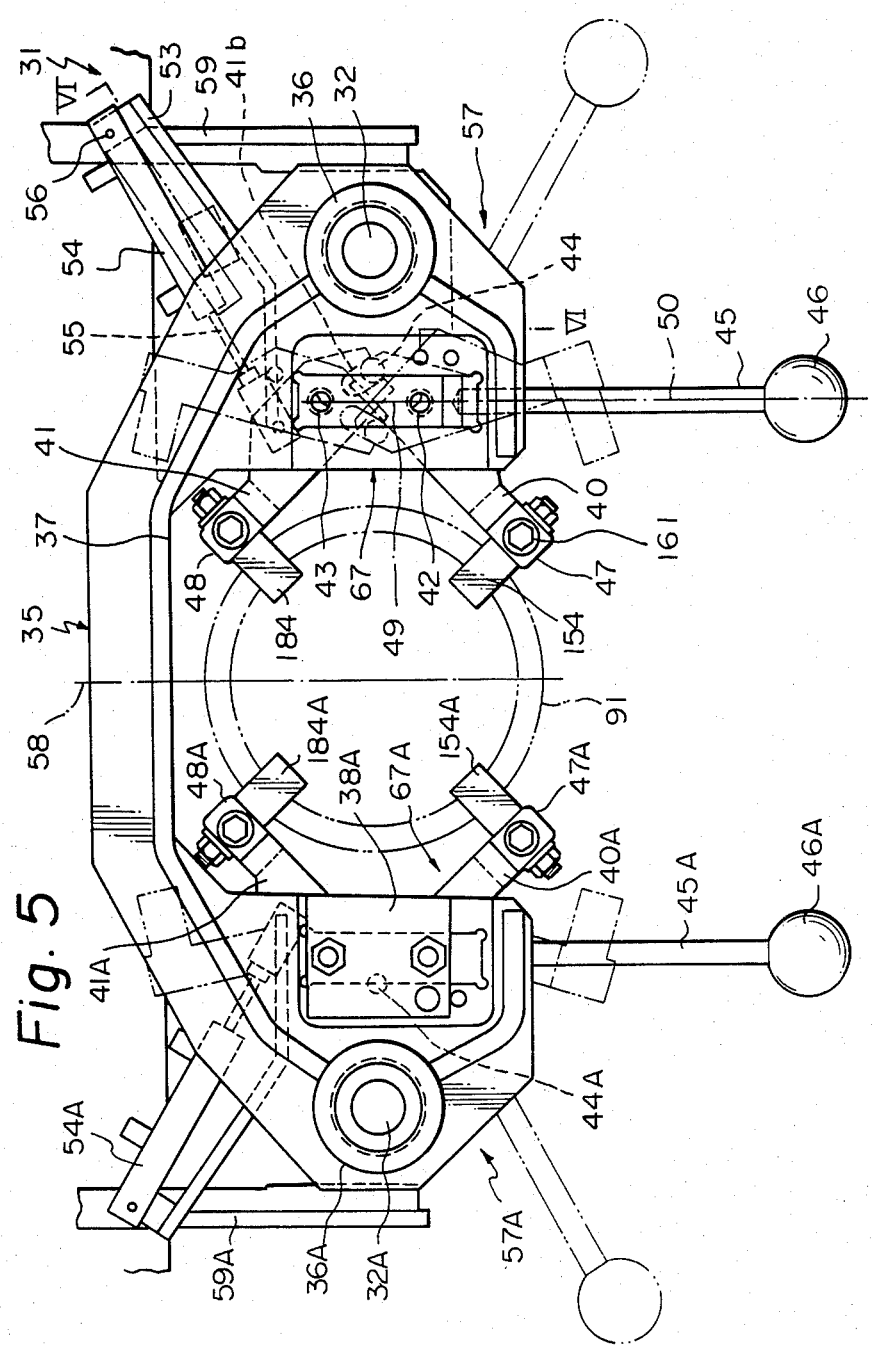
FIG. 5 is an enlarged top plan view of a coil spring compressing mechanism.

As shown in FIG. 5, the carriage 35 is generally C-shaped and has a roughly square recess 37 having a sufficient size not to interfere with a coil spring 91 to be assembled. The carriage 35 carries left-hand compressing assembly and a right-hand compressing assembly indicated generally by the reference numerals 67 and 67A, respectively.

Figure 6:
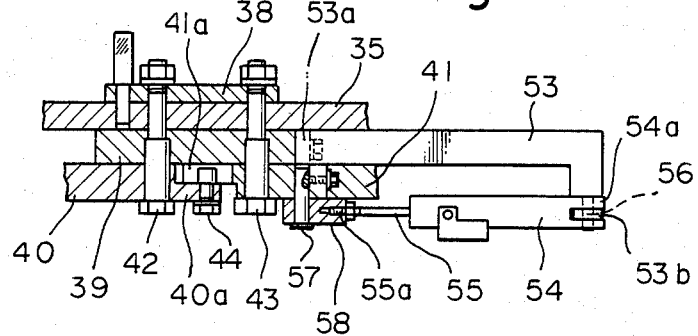
FIG. 6 is a cross-sectional view taken along the line VI—VI of FIG. 5.

As shown in FIG. 6, the left-hand compressing assembly 67 includes an upper plate 38 and a lower plate 39 positioned on the upper and lower sides of the carriage 35, respectively. Front and rear compressor arms 40 and 41 are arranged under the lower plate 39 parallel to the carriage 35. The upper plate 38, carriage 35, lower plate 39, and front arm 40 are assembled together by a bolt 42, while the upper plate 38, carriage 35, lower plate 39, and front arm 41 are assembled together by a bolt 43. Thus, the front and rear compressor arms 40 and 41 are pivotable about the bolts 42 and 43 parallelly to the carriage 35.

As shown in FIG. 6, the opposite ends of the compressor arms 40 and 41 located between the bolts 42 and 43 are recessed to an approximately half of their thickness to form ledged portions 40a and 41a which slidingly engage with each other. The ledged portion 41a is provided with an elongated aperture or slot 41b (FIG. 5) in which engages a coupling pin 44 mounted to the ledged portion 40a. With this arrangement, when the front arm 40 is turned in one direction about its bolt 42, the rear arm 41 rotates in the opposite direction about the bolt 43.

Figure 7:
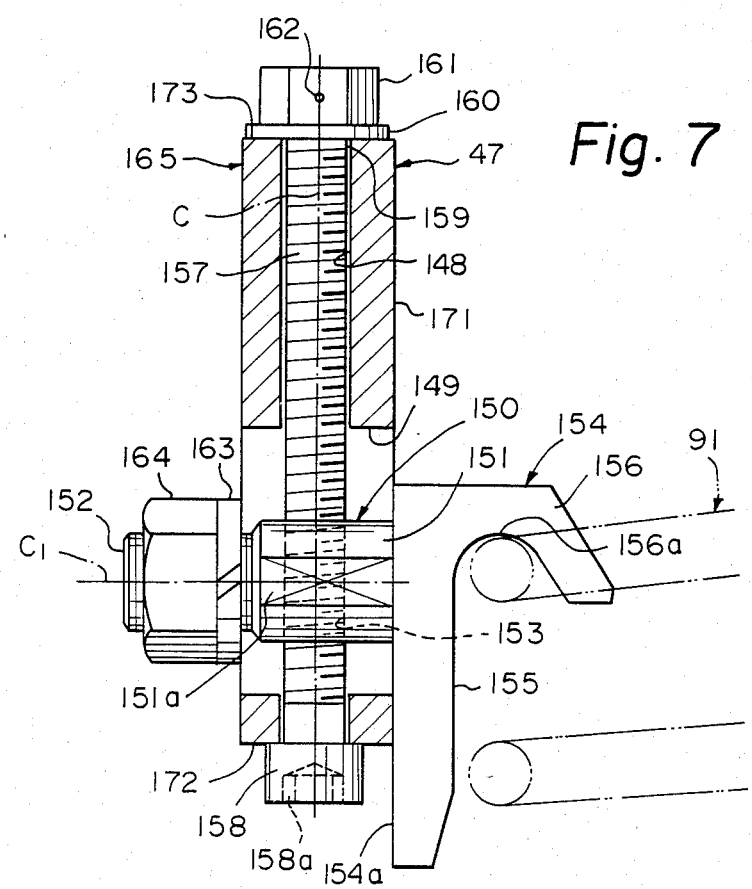
FIG. 7 is a partially sectioned enlarged front elevational view of an adjusting mechanism of the vertical position of a push-down finger, according to the invention.
Figure 8:
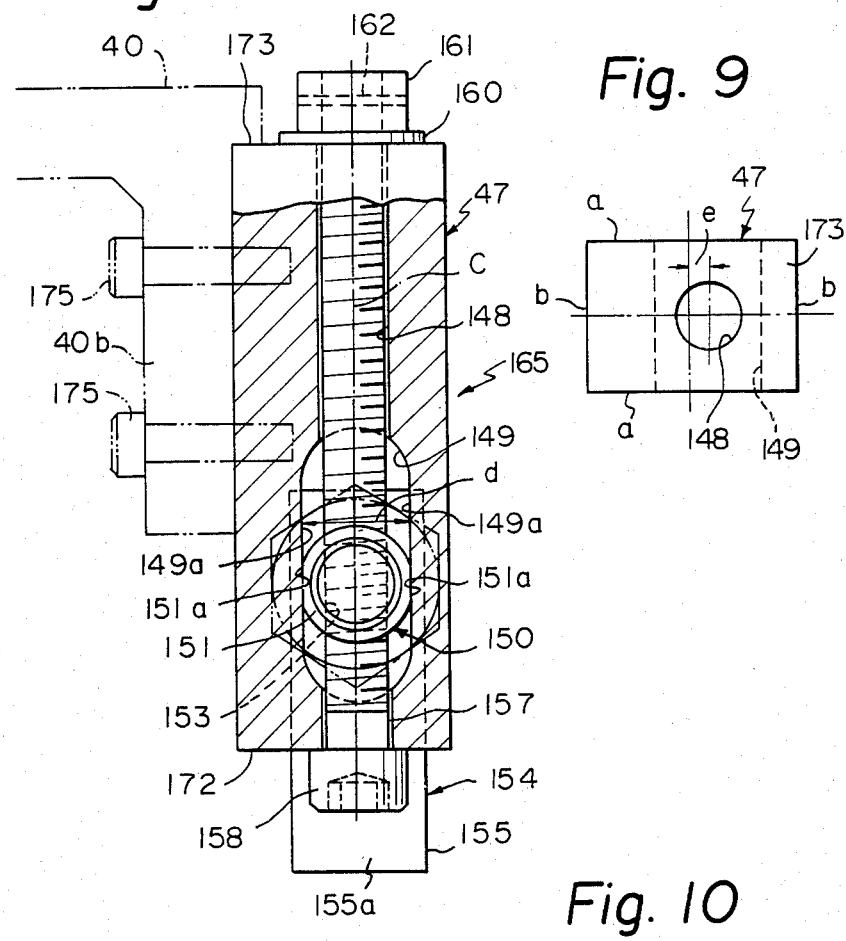
FIG. 8 is a partially sectioned side elevational view of FIG. 7.
Figure 9:
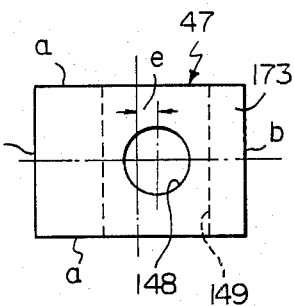
FIG. 9 is a plan view of a finger mount shown in FIGS. 7 and 8.
Figure 10:
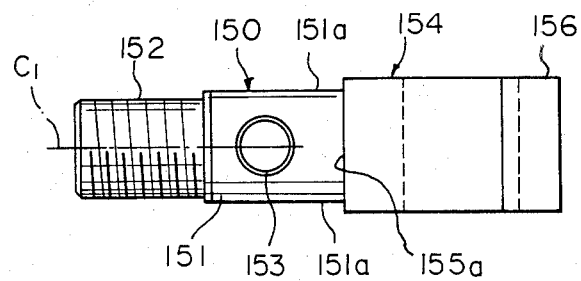
FIG. 10 is an enlarged plan view of a finger assembly with a push-down finger according to the invention.

According to the present invention, the front and rear compressor arms 40 and 41 are provided with finger mounts 47 and 48 which are secured by means of bolts 175 (FIG. 8) and which are, in turn, provided with push-down fingers 154 and 184 adjustable with respect to the finger mounts 47 and 48, respectively. Each of the finger mounts 47, 48, for example, the finger mount 47, is in the form of an angular rod having rectangular upper and lower faces 173 and 172 defined by long sides a and short sides b, as shown in FIGS. 7 to 9. The finger mount 47 has an eccentric through hole 148 extending along the longitudinal direction of tne finger mount. The hole 148 has a center line C which lies in a center median plane between the long sides a and in a plane deviated or eccentric from a center median plane between the short sides b by an offset e (FIG. 9). The finger mount 47 has an elongated cross hole 149 which extends through the finger mount in the lateral direction and which is located adjacent to the lower face 172. The longitudinal axis of the elongated hole 149 lies in a plane in which the center line C of the eccentric hole 148 lies. The elongated hole 149 has a width d larger than the diameter of the eccentric hole 148.

A finger assembly 150 which is to be attached to the finger mount 47 has a shaft 151 having a diameter larger than the width d of the elongated hole 149 and a smaller threaded portion 152 having a diameter smaller than the diameter of the shaft 151, and a push-down finger 154 secured to the shaft 151. The shaft 151 is provided with a vertically extending threaded hole 153 perpendicular to a horizontal axis $C_1$ of the shaft 151. The shaft 151 has opposite parallel side flat faces 151a which are formed by cutting the diametrally opposed side portions of the shaft 151 into flat faces so that the shaft 151 is fitted in the elongated hole 149 for slide movement along the longitudinal axis C while being in contact with the side walls of the elongated hole 149. The finger 154 has a body 155 rigidly connected to the shaft 151 and a hook 156 with an abutment recess 156a which is adapted to bear against the coil spring 91 without the coil spring accidentally coming out of the abutment recess 156a. The finger 154 generally presents an inverted L-shape. The finger assembly 150 is inserted in the elongated hole 149 of the finger mount 47 so that the threaded portion 152 projects outward from the elongated hole 149 and that the threaded hole 153 of the shaft 151 is aligned with the through hole 148 of the finger mount 47. An adjusting bolt 157 extends through the through hole 148 and is threaded into the threaded hole 153 of the shaft 151.

The adjusting bolt 157 which forms a finger adjusting device 165 is longer than the finger mount 47 and has a head 158 with a, for example, hexagonal recess 158a in which a hexagonal wrench (not shown) can be fitted to rotate the bolt 157. A nut 161 is screwed onto an upper projecting threaded end 159 of the bolt 157 through a washer 160 to prevent the bolt 157 from falling down from the through hole 148. A detent pin 162 extends through the nut 161 and the threaded end 159 of the bolt 157 to prevent a relative rotation between the nut and the bolt, so that the nut 161 and the bolt 157 can rotate together with respect to the finger mount 47. The rotation of the adjusting bolt 157 in the through hole 148 causes the finger assembly 150 to move up and down in the elongated hole 149 while being guided at the flat side faces 151a by the side walls 149a of the elongated hole 149, since the bolt 157 is screwed in the threaded hole 153 of the shaft 151. When the finger assembly 150 moves up and down, the rear face 154a of the finger 154 slides on a mating face 171 of the finger mount 47. Thus, the vertical position of the finger 154 can be adjusted with respect to the finger mount 47. After the adjustment is completed, a nut 164 threaded on the threaded portion 152 of the finger assembly 150 through a spring washer 163 is fastened to secure the finger assembly 150 immovably to the finger mount 47. It goes without saying that when the vertical position of the finger 154 is adjusted, the nut 164 is loosened. The finger adjusting device 165 having the finger mount 47, the adjusting bolt 157, and the finger assembly 150 is secured to a support 40b integral with the front arm 40, by means of the bolts 175, as shown in FIG. 8. To the rear arms 41, is also secured a finger adjusting device similar to the adjusting device 165 having a finger mount 48 with an adjustable finger 184. It should be noted that the rear finger 184 is positioned lower than the front finger 154 by a quarter of the pitch of the coil spring 91.

The front arm 40 is provided connected thereto with a handle 45 having a ball end 46 (FIG. 5). The mutual positional relationship of the front and rear arms 40 and 41 and handle 45 is such that, when an axis 50 of the handle 45 is aligned with the line 49 passing through the axes of the bolts 42 and 43, the fingers 154 and 184 are brought inward toward the center of the C-shaped carriage 35 with the axis 51 of the front finger 154 intersecting at a right angle with the axis 52 of the rear finger 184.

The left-hand compressing assembly 67 further includes a pneumatic actuator comprising a pneumatic cylinder 54. To provide a support for the cylinder 54, a bracket 53 is bolted at its front end 53a to the outer end of the lower plate 39, the rear end of the bracket 53 being bent downward and then horizontally to form a free end 53b to which the forked end 54a of the cylinder 54 is connected by means of a pin 56. The threaded end 55a of an output rod 55 of the cylinder 54 is screwed into a block 58 which is rotatably mounted to the rear arm 41 by a pin 57 at the vicinity of the bolt 43. The pneumatic cylinder 54 is connected to a suitable source of compressed air via a switching valve (not shown) and is so designed that when its output rod 55 is retracted, the internal working chamber is connected to the drain port so that the output rod can be pulled out by exerting a manual force thereon.

Adjacent to and inward of the guide bar 32A, the slidable carriage 35 carries a right-hand compressing assembly indicated generally by the reference numeral 67A (FIG. 5). Parts and members pertaining to the right-hand compressing assembly are similar to those of the left-hand compressing assembly and are arranged in a symmetrical manner with respect to the center line 58. Thus, these parts and members are indicated in the drawings by the reference numerals for the parts and members of the left-hand assembly with a suffix A. The right-hand assembly 67A includes among others a front compressor arm 40A provided with a ball-ended operating handle 45A and a rear compressor arm 41A connected to a pneumatic cylinder 54A. The arms 40A and 41A are provided with finger mounts 47A and 48A having adjustable fingers 154A and 184A similar to the left-hand front and rear fingers 154 and 184, respectively. The finger 184A of the rear finger mount 48A is positioned at a lower level by a quarter of the pitch of coil spring 91 than that of the finger 184 of the left-hand rear finger mount 48. Similarly, the front finger 154A is positioned lower by a quarter of the pitch than the finger 184A.

As best shown in FIG. 5, the carriage 35 is provided at both extremities thereof with counterweights 59 and 59A to provide a rotational vector force to the carriage 35 in order to prevent the carriage 35 from coming down along the guide bars 32 and 32A, by the friction.

Referring again to FIGS. 1 and 2, in order to firmly hold an upper spring seat for retaining the coil spring during the assembly of the suspension system, the head plate 31 is provided with a conventional upper spring seat clamp 60 comprising clamping arms 61 and 62 mounted pivotably to the plate 31 by a bolt 63. The clamping arms 61 and 62 are adapted to be actuated by a wedge-shaped cam plate 69 engaging the rear ends of the clamping arms and connected through a coupling member 70 to an output rod 68 of a pneumatic cylinder 67 mounted on a cylinder support plate 66. The plate 66 is supported by a pair of columns 64 and 65 rigidly connected to the rear part of the head plate 31. The arrangement is such that as the rod 68 of the cylinder 67 moves down the cam plate 69 engages the rear parts of the clamping arms 61 and 62 causing the clamp 60 to open, and vice versa.

The pneumatic cylinder 67 is connected to a suitable compressed air source and is adapted to be controlled by a control valve, not shown, which, in turn, is controlled by a pair of limit switches 74 and 75 mounted on the support column 64. Connected to the coupling member 70 is a bar 71 on which a pair of dogs 72 and 73 are mounted. The dogs 72 and 73 are designed such that on supplying the compressed air into one of the pressure chambers of the cylinder 67 to move the cam plate 69 into engagement with the clamping bars, the dog 73 is brought into contact with the limit switch 75 causing the valve to turn off, whereby the downward movement of the cam bar 69 is stopped, and on supplying the air into another pressure chamber, the cam bar goes up together with the dog 72 which then contacts the limit switch 74 to turn off the air supply.

The base 1 is provided with an upper limit switch 76 and a lower limit switch 77 which cooperate with a pair of dogs 79 and 80 secured to a bar 78 suspended from a plate 81 attached to the cross member 27. These limit switches 76 and 77 serve to limit the upper and lower extremities of the travel of the threaded drive shaft 9. As the motor 2 rotates in one direction to lower the drive shaft 9 together with the integral cross member 27, the dog 80 engages the lower limit switch 77 which turns off the motor 2 and energizes the brake 5. On the contrary, as the motor 2 rotates in the reverse direction to lift the drive shaft 9, the dog 79 engages with the upper limit switch 76 thereby to stop the upward movement of drive shaft 9.

The operation of the coil spring compressor according to the invention is as follows.

At the outset of each cycle of the assemble operation of suspension system, the cam bar 26 is in contact with the roller 18 so that the clamping arms 14 and 15 of the clamping mechanism 13 are opened from each other. First, a strut 90 forming part of the suspension system to be assembled is introduced between the clamping arms 14 and 15 and is placed on the bed plate 1b as shown by the phantom line in FIGS. 1 and 2. On being inserted, the strut 90 engages the sensing lever 24 causing it to swing to actuate the switch 23 which in turn actuates the motor 2 to rotate in the forward direction. This causes the drive sleeve 8 to turn in the forward direction through the pulley 4, belt 11, and pulley 10, so that the drive shaft 9 beings to be lowered together with the head plate 31, carriage 35, and cam bar 26. The downward movement of the cam bar 26 releases the pressure on the roller 18, allowing the clamping arms 14 and 15 to swing inward under the action of the spring 25 so that the strut 90 is clamped and retained on the bed plate 1b. The closure of the clamping mechanism 13 is sensed by a switch (not shown) which disconnects the clutch 3 and energizes the brake 5 to restrain the drive sleeve 8 and, hence, the drive shaft 9.

Then the operator places a coil spring 91 on the lower spring seat 90a of the strut 90 and an upper spring seat 92 thereon. Thereafter, the operator grips the handle 45 and 45A by hand and slides the carriage 35 upward or downward along the guide bars 32 and 32A to adjust the vertical position of the carriage in such a manner that the fingers 154, 154A, 184, and 184A are leveled between the first and second turns of the coil spring 91. The operator then pulls the handles 45 and 45A together as shown by the solid line in FIG. 5, whereby the front arms 40 and 40A move conjointly with the rear arms 41 and 41A toward the spring 91 so that the four fingers are introduced between the first and second turns of the coil spring 91. The manual movement of the handles 45 and 45A is not hindered by the pneumatic cylinders 54 and 54A because the internal pressure chambers of the cylinders are connected to the drain ports at the retracted position of the cylinders as described before.

After the four fingers are introduced between the first and second turns of the coil spring 91, the carriage 35 is manually moved downward to bring the four fingers into contact with the associated portions of the coil spring. The operator checks whether all of the four fingers are in contact with the coil spring. If one or some of the fingers 154, 154A, 184, and 184A is or are not in contact with the coil spring, the vertical position(s) of the wrong finger(s) is adjusted by the adjusting bolt 157 so that all of the fingers come into contact with the coil spring 91.

Figure 11:
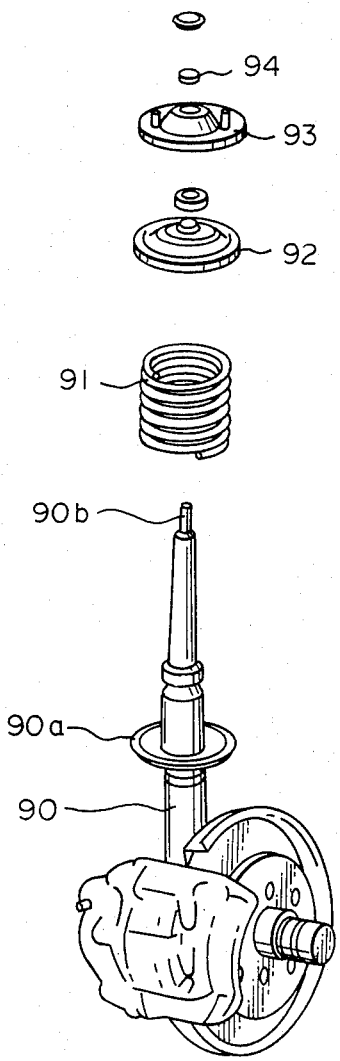
FIG. 11 is an exploded perspective view of a conventional shock absorber assembly.

On turning on a manual switch, the motor is rotated once again in the forward direction causing the drive shaft 9 to move further downward so that the fingers 154, 154A, 184, 184A compress the coil spring. The downward movement of the drive shaft 9 is accompanied by a similar movement of the members integral therewith such as the head plate 31, upper spring seat clamp 60, air cylinder 67, and cross member 27. When the drive shaft 9 has traveled through a predetermined distance, the lower dog 80 attached to the cross member 27 abuts against the lower limit switch 77 to turn off the motor 2. Simultaneously, a suitable switching mechanism, not shown, actuates the pneumatic cylinder 67 to bring the cam plate 69 into engagement with the clamping arms 61 and 62 to close them together, so that the upper spring seat 92 is clamped by the clamp 60. Then, the operator inserts an upper support 93 and screws a nut 94 onto the upper threaded end 90b of the strut 90 in a conventional manner to retain the upper spring seat 92 thereon (FIG. 11).

After the coil spring 91 has been assembled to the strut 90 in the foregoing manner, the operator turns on a switch (not shown) associated with the pneumatic cylinder 67 to release the upper spring seat from the clamping mechanism 60. Then, the operator actuates a switch (not shown) for the motor 2 to turn it in the reverse direction and turns on a switch (not shown) for supplying the compressed air to the releasing cylinders 54 and 54A. The drive shaft 9 begins shifting upward together with the carriage 35, and the cylinders 54 and 54A exert a pull on the rear arms 41 and 41A. However, as there exists a considerable frictional force acting between the compressing fingers and the coil spring during the initial return travel of the carriage 35 in which travel the coil spring is still in a compressed state, the fingers remain engaged with the coil spring. As the drive shaft 9 is raised further, the frictional force reduces so that the fingers are finally disengaged from the coil spring 91, whereby the compressive force applied on the spring is released. The drive shaft 9 continues its upward movement until the upper dog 79 associated with the cross member 27 comes into contact with the upper limit switch 76 whereupon the motor 2 is turned off. In this stage, the cam bar 26 is brought into engagement with the roller 18 so that the clamping mechanism 13 is released, thereby allowing the assembled suspension system to be taken out of the machine.

What is claimed is:

1. An improved coil spring compressor for use in the assembly of automotive suspension systems, said coil spring compressor being of the type in which a movable head plate is provided above a base for movement toward and away from said base to compress a coil spring mounted on a suspension strut which forms part of the suspension system to be assembled and which is secured to said base, wherein the improvement comprises:

a pair of spaced guide bars connected to and pending from said movable head plate;

a slidable carriage mounted on said guide bars for sliding movement; and a pair of compressing assemblies mounted on said carriage opposite with one another at both sides of said coil spring, each of said compressing assemblies comprising a pair of compressor arms pivoted to the carriage and provided, respectively, with a finger mount at the inner free end thereof, compressing finger assemblies adjustably attached to the corresponding finger mounts, and means for independently adjusting relative positions of the finger assemblies to the associated finger mounts, one of said compressor arms being provided with an operating handle, said compressor arms being interconnected with each other so that on actuating said one arm by said handle the finger assemblies on both arms conjointly extend toward the coil spring to engage between any desired successive turns of the coil spring.

2. A coil spring compressor according to claim 1, wherein said adjusting means comprises adjusting bolts rotatably held in and by the associated finger mounts and screw-engaged in the finger assemblies and wherein said finger assemblies are held movable along the longitudinal directions of the adjusting bolts without rotation together with the latter, so that the rotation of the adjusting bolts causes the finger assemblies to move in the longitudinal directions of the adjusting bolts.

3. A coil spring compressor according to claim 2, wherein each of said finger assemblies comprises a hook-like finger which engage the coil spring to compress the same, and a shaft having a threaded hole in which the associated adjusting bolt is screwed.

4. A coil spring compressor according to claim 3, wherein each of said finger assemblies comprises a threaded portion on which a fastening member can be screw-engaged.

5. A coil spring compressor according to claim 3, wherein each of said finger mounts comprises an elongated hole through which the shaft of the associated finger assembly extends and which allows the move me0t of the associated finger assembly in the longitudinal axis direction of the elongated hole within a predetermined limit.

* * * * *